United States Patent
Adl-Tabatabai et al.

(10) Patent No.: US 7,080,354 B2
(45) Date of Patent: Jul. 18, 2006

(54) METHOD FOR IMPLEMENTING DYNAMIC TYPE CHECKING

(75) Inventors: Ali-Reza Adl-Tabatabai, Santa Clara, CA (US); Guei-Yuan Lueh, San Jose, CA (US); Tatiana Shpeisman, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 468 days.

(21) Appl. No.: 10/109,939

(22) Filed: Mar. 29, 2002

(65) Prior Publication Data
US 2003/0188295 A1    Oct. 2, 2003

(51) Int. Cl.
*G06F 9/44* (2006.01)

(52) U.S. Cl. ............ 717/116; 717/114; 717/118; 717/143

(58) Field of Classification Search ........ 717/168–178, 717/114, 116, 118, 143; 709/315; 719/315; 707/103
See application file for complete search history.

(56) References Cited

U.S. PATENT DOCUMENTS

| | | | | |
|---|---|---|---|---|
| 5,093,914 A | * | 3/1992 | Coplien et al. ............. | 717/129 |
| 5,557,793 A | * | 9/1996 | Koerber .................. | 707/103 R |
| 5,590,327 A | * | 12/1996 | Biliris et al. ................ | 718/100 |
| 5,721,925 A | * | 2/1998 | Cheng et al. ............... | 719/315 |
| 6,182,283 B1 | * | 1/2001 | Thomson ................... | 717/153 |
| 2002/0016864 A1 | * | 2/2002 | Brett ......................... | 709/315 |

OTHER PUBLICATIONS

Agrawal et al., Static Type Checking of Multi-Methods, p. 113-128.*

* cited by examiner

*Primary Examiner*—Wei Y. Zhen
*Assistant Examiner*—Mulubrhan Tecklu
(74) *Attorney, Agent, or Firm*—Blakely, Sokoloff, Taylor & Zafman LLP

(57) ABSTRACT

Methods and apparatuses for dynamic type checking are described. For one embodiment runtime code generation is used to effect dynamic type checking by generating code specialized to different object types. For one embodiment a virtual dynamic type check (DTC) function is generated for each object at run time. The virtual DTC function contains a sequence of instructions to type check every element (type) within an object's type hierarchy. The virtual DTC function is tailored for a particular type and thus conducts dynamic type checking more efficiently for objects of the particular type. For one embodiment the DTC function can complete type checking of interface type hierarchies. For one embodiment a compiler may determine whether a type is a class type or interface type and may generate a virtual DTC function only for interface types.

30 Claims, 3 Drawing Sheets

METHOD FOR IMPLEMENTING DYNAMIC TYPE CHECKING

FIELD OF THE INVENTION

One embodiment of the present invention relates generally to object-oriented computer programming languages, and more specifically to methods and apparatuses to provide more efficient dynamic type checking.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Object-oriented computer programming languages such as JAVA and C# typically employ type hierarchies. In computer languages, types are used to describe a given entity. For example, a computer language may employ a data structure having various fields used to describe the subject type. The information contained within the fields uniquely defines the type. In object-oriented languages types have hierarchy, i.e., one type can be a subtype or supertype of another, e.g., type "apple" is a subtype of type "fruit", and is a supertype of type "red apple". Once the type is determined for some data in computer memory, it may be necessary to determine whether that type is a subtype of another type. Consider a type hierarchy for type T in which T has a subtype T' and T' has a subtype T". It is known at compile time that T' is of type T and that T" is of type T' and thus of type T. At run time it may be necessary to determine if an object of type T is actually of type T". For example, at compile time it is known that all apples are fruit and that all red apples are apples and fruits. At run time a program may need to determine if an object of type apple is actually an object of type red apple. This type checking is a very common operation in object-oriented languages. Type checking may be accomplished through use of instructions at runtime, e.g., in virtual machines.

One method of dynamic type checking is to implement, within each object, a field that points to a data structure that identifies the object type. That is, all objects of a given type will point to the same data structure. The data structure is metadata (data pertaining to data) for objects of that type. The data structure reflects the type hierarchy, so each data structure contains a field that points to its supertype. For example, for an object of type apple, the object will contain a field pointing to the metadata for its supertype, namely fruit. Therefore, to determine if an object is of a given type at runtime, the metadata for the object is examined and then successive supertypes are examined by traversing the type hierarchy. The supertype pointer at each data structure is dereferenced to obtain the next successive supertype. In general, the process is continued recursively until it is determined that a given type is a subtype of another type or until a root type is reached. This type of dynamic type checking algorithm is referred to as a linked data structure dynamic type checking algorithm. Each time a supertype pointer is obtained and dereferenced the process requires memory access. Such recursive memory access taxes processing resources and is time consuming.

An alternative method of dynamic type checking is to create a type hierarchy array for each object type that assigns an index to each element indicating depth in the type hierarchy. The number indicates the depth of the node within the type hierarchy. For example, index 0 may be assigned to the root type, index 1 may be assigned to type fruit (a subtype of the root type), index 2 may be assigned to type apple, index 3 may be assigned to type red apple, and so on. Each object contains a pointer to the array that contains its type hierarchy data. At run time, when it is necessary to determine if an object is of a specific type, the type hierarchy array for the object is accessed and the appropriate index is evaluated. If the index does not contain the type in question, then the object is not an instance of that type. For example, the type hierarchy array is accessed to check whether an object of type fruit is of type apple. Index 2 (the index assigned to type apple) is evaluated, if index 2 contains type apple, then the object is of type apple. If index 2 is empty or contains some other type (e.g., orange), or the array does not have an index 2, then the object is not of type apple.

Although the type hierarchy array reduces the required processing due to recursive memory access it can only be implemented for a subset of type hierarchies. In languages such as JAVA and C#, type hierarchies may be of two types; class types and interface types. For classes, the types have only one supertype (a type may have numerous subtypes), yielding a tree structure for the type hierarchy. This allows the type hierarchy array, as discussed above, to be created. Interfaces, on the other hand may have multiple supertypes, yielding a directed acyclic graph (DAG) structure for the type hierarchy. That is, because a type may have more than one supertype, a given index for a type hierarchy array may not be determined. Additionally, because the size of the array is fixed, the technique does not work if the depth of the type hierarchy exceeds the size of the array.

BRIEF DESCRIPTION OF THE DRAWINGS

Embodiments of the present invention are illustrated by way of example, and not limitation, by the figures of the accompanying drawings in which like references indicate similar elements and in which.

DETAILED DESCRIPTION

Embodiment of the present invention provides methods and apparatuses for more efficient dynamic type checking. For one embodiment runtime code generation is used to effect dynamic type checking by generating code specialized to different object types. For one embodiment a virtual dynamic type check (DTC) function is generated for each object at run time. The virtual DTC function contains a sequence of instructions to type check every element (type) within an object's type hierarchy. The virtual DTC function is tailored for a particular type and thus conducts dynamic type checking more efficiently for objects of the particular type. For one embodiment the DTC function can complete type checking of interface type hierarchies. For one embodiment a compiler may determine whether a type is a class type or interface type and may generate a virtual DTC function only for interface types.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Figure 1:
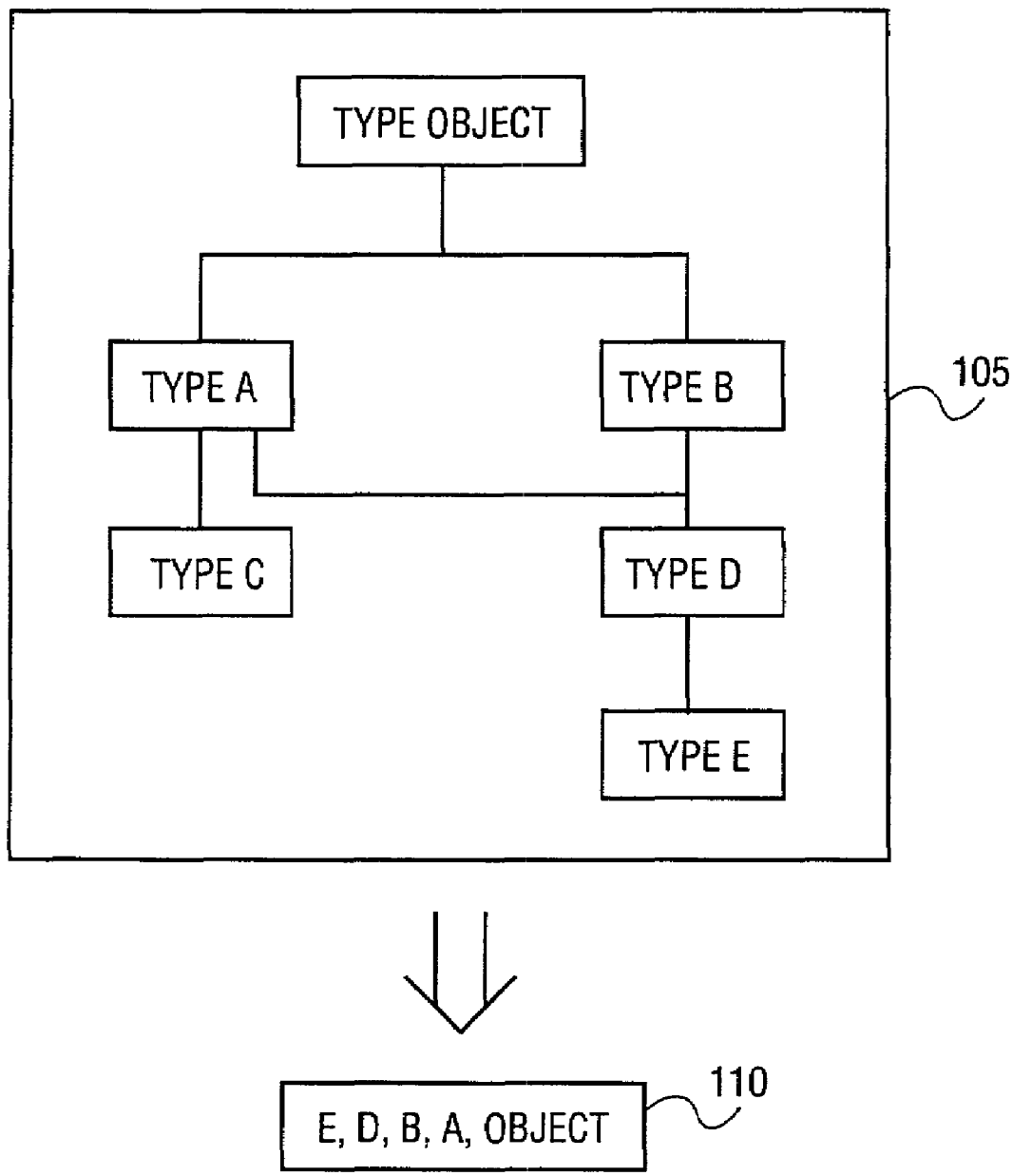
FIG. 1 illustrates the determination of dynamic type checking for an interface type in accordance with the one embodiment of the present invention.

FIG. 1 illustrates the determination of dynamic type checking for an interface type in accordance with one embodiment of the present invention. As shown in FIG. 1, type hierarchy 105 has a DAG architecture; this is due to the fact that type D has multiple supertypes, namely, type A and type B. In accordance with an embodiment of the present invention, the DAG architecture is "unrolled" to obtain a set of all types in the type hierarchy of a given type (a type hierarchy set for the given type). That is, the search loop of a prior art linked data structure dynamic type checking algorithm is unrolled to obtain a type hierarchy set for a specified type. For example, type hierarchy set 110 contains types E, D, B, A, and Object (all of the types in type E's hierarchy). To effect a type check of type E, code is generated to specifically check each type in type E's hierarchy. The run time code generator knows all of the supertypes of each object, therefore, when the code is generated the type hierarchy may be fully unrolled and each element in the hierarchy checked individually without reference to where the element appears in the hierarchy. Also, the type identifiers are loaded from instruction immediates rather than from memory. This results in code that is much faster than a generic search function.

Typically in object-oriented languages, each type defines a set of virtual methods that are functions for that type. Thus the metadata for an object of a given type may contain a virtual function table containing all of the virtual functions for that type. An embodiment of the present invention defines a virtual DTC function (virtual method) on the root type of the type hierarchy (e.g., java.lang.Object in Java and System.Object in CLI). The virtual DTC function supplants the root type's runtime dynamic type check function. A call to the runtime dynamic type check function becomes a call to the virtual DTC function. In one embodiment, a runtime code generator generates the code for the virtual DTC function when the object is loaded or initialized. In alternative embodiments, the code may be generated the first time the virtual DTC function is invoked or the first time an instance of the object is allocated.

Figure 2:
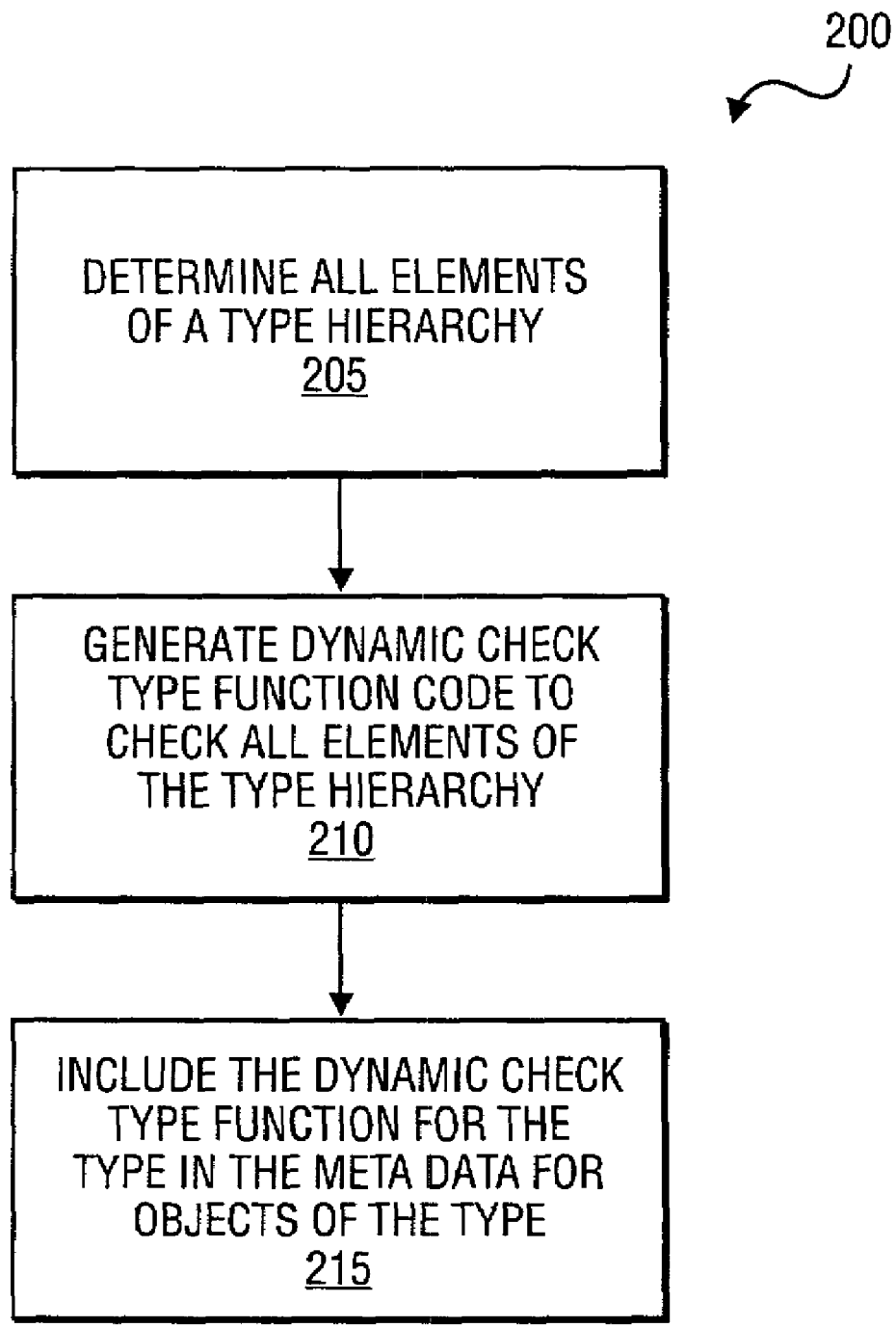
FIG. 2 is a process flow diagram in accordance with the embodiment of the present invention.

FIG. 2 is a process flow diagram in accordance with one embodiment of the present invention. Process 200, shown in FIG. 2, begins at operation 205 in which all of the elements of the type hierarchy of a type are determined. For example, as shown above in FIG. 1, type E is a subtype of type D, type D is a subtype of both types A and B, and types A and B are each a subtype of type Object. Therefore, the elements of type E's type hierarchy are types E, D, B, A, and Object.

At operation 210, a dynamic type check function is generated that checks all of the elements in the type hierarchy set. That is, the compiler generates a dynamic type check function that is tailored for objects of a specified type. Therefore, the search loop of prior art dynamic type checking methods is replaced by a sequence of instructions in an embodiment of the present invention. For one embodiment, the dynamic type check function may be implemented as two, more specialized, virtual methods: one that checks only the supertypes of an object and one that checks only the superinterfaces of an object. That is, because a given type is known at compile time, the compiler can determine whether the type is an interface or class type. Therefore, when the DTC function code is generated to check whether an object is an instance of a given type, the code may be generated specifically for a class type, if the type being checked is a class type or the code may generated specifically for an interface type, if the type being checked is an interface type.

For one embodiment, where instances of type C are repeatedly checked against a particular supertype of type C, specialized code is generated that checks the particular super type of C before checking other supertypes of C.

When the number of super types is small, a linear search may execute fewer instructions on the average than a binary search. For one embodiment, the compiler may choose between a binary search code sequence, and a linear search code sequence based on the number of super types.

At operation 215 the DTC function created for a specified type is included in the metadata for all objects of the given type. The DTC function is included for those objects that may require dynamic type checking. An embodiment of the present invention executes no memory accesses and reduces the number of branch instructions required as compared to the prior art general search algorithm thereby reducing the time required for dynamic type checking. Attached, as Appendix A is exemplary pseudo-code for embodiments of the present invention.

Figure 3:
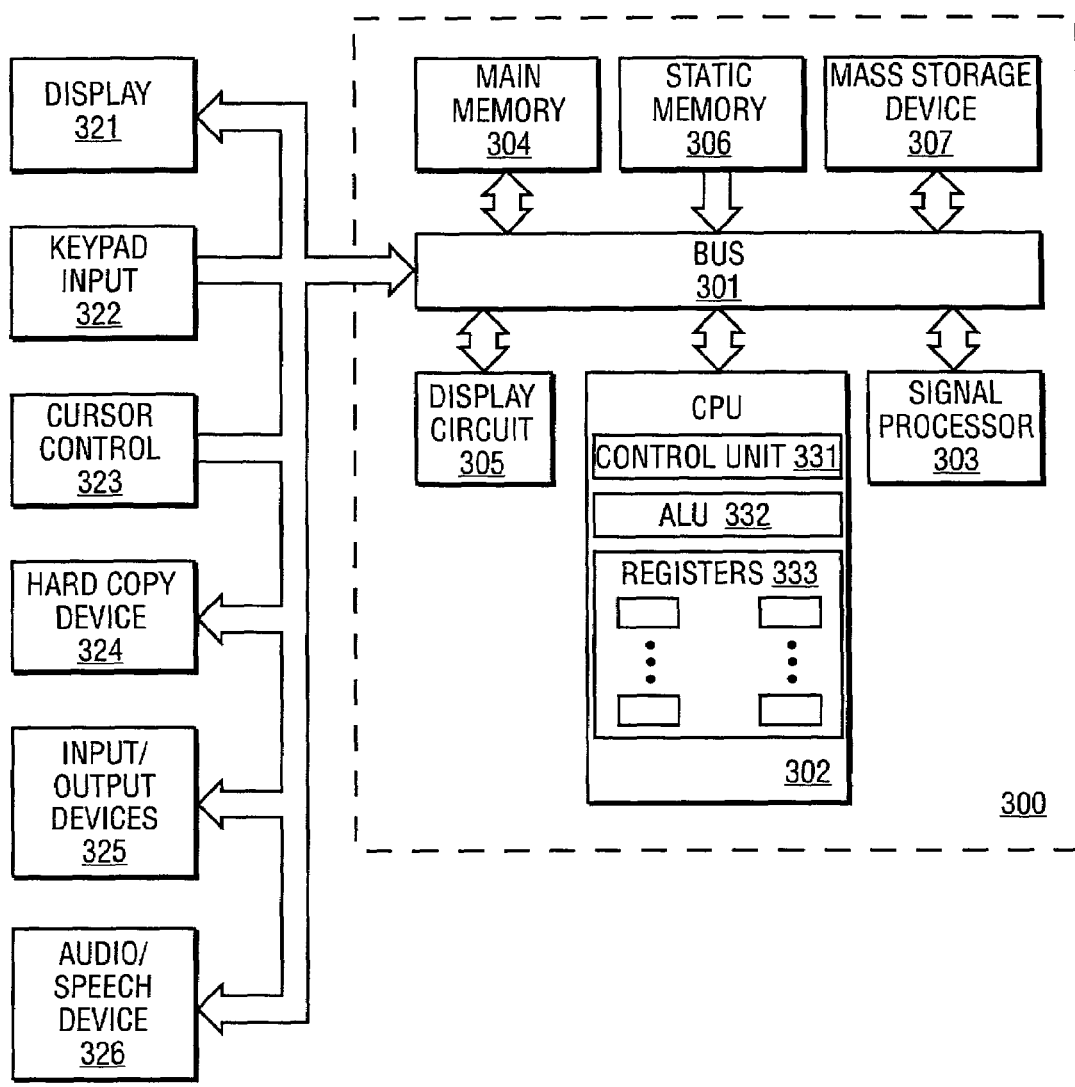
FIG. 3 illustrates an exemplary computing system for implementing a dynamic type checking method in accordance with an embodiment of the present invention.

FIG. 3 illustrates an exemplary computing system 300 for implementing a dynamic type checking method in accordance with an embodiment of the present invention. The determination of type hierarchy and generation of DTC virtual functions described herein may be implemented and utilized within computing system 300, which may represent a general-purpose computer, portable computer, or other like device. The components of computing system 300 are exemplary in which one or more components may be omitted or added. For example, one or more memory devices may be utilized for computing system 300.

Referring to FIG. 3, computing system 300 includes a central processing unit (CPU) 302 and a signal processor 303 coupled to a display circuit 305, main memory 304, static memory 306, and mass storage device 307 via bus 301. Computing system 300 may also be coupled to a display 321, keypad input 322, cursor control 323, hard copy device 324, input/output (I/O) devices 325, and audio/speech device 326 via bus 301.

Bus 301 is a standard system bus for communicating information and signals. CPU 302 and signal processor 303 are processing units for computing system 300. CPU 302 or signal processor 303 or both may be used to process information and/or signals for computing system 300. CPU 302 includes a control unit 331, an arithmetic logic unit (ALU) 332, and several registers 333, which are used to process information and signals. Signal processor 303 may also include similar components as CPU 302.

Main memory 304 may be, e.g., a random access memory (RAM) or some other dynamic storage device, for storing information or instructions (program code), which are used by CPU 302 or signal processor 303. Main memory 304 may store temporary variables or other intermediate information during execution of instructions by CPU 302 or signal processor 303. Static memory 306, may be, e.g., a read only memory (ROM) and/or other static storage devices, for storing information or instructions, which may also be used by CPU 302 or signal processor 303. Mass storage device 307 may be, e.g., a hard or floppy disk drive or optical disk drive, for storing information or instructions for computing system 300.

Display 321 may be, e.g., a cathode ray tube (CRT) or liquid crystal display (LCD). Display device 321 displays information or graphics to a user. Computing system 300 may interface with display 321 via display circuit 305. Keypad input 322 is a alphanumeric input device with an analog to digital converter. Cursor control 323 may be, e.g., a mouse, a trackball, or cursor direction keys, for controlling movement of an object on display 321. Hard copy device 324 may be, e.g., a laser printer, for printing information on paper, film, or some other like medium. A number of input/output devices 325 may be coupled to computing system 300. A dynamic type checking algorithm in accordance with an embodiment of the present invention may be implemented by hardware and/or software contained within computing system 300. For example, CPU 302 or signal processor 303 may execute code or instructions stored in a machine-readable medium, e.g., main memory 304.

The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions may be represented by carrier-wave signals, infrared signals, digital signals, and by other like signals.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

Appendix A

The following code sequences illustrate this invention.

Assume the CheckType method is at offset 4 in the method table.

The runtime compiler generates the following IA-32 (Intel Corporation 32-bit Architecture) code for calling X.CheckType(T):

```
mov    eax,   X         ; assume we start off with X in eax
mov    eax,   [eax]     ; load vtable of X
mov    ecx,   T         ; load immediate of T's descriptor
call   [eax+4]          ; call X.CheckType (T)
```

Consider a concrete class C that has the super classes C1, C2 and C3, and the super interfaces I1, I2, and I3. The runtime code generator produces the following IA-32 code for C::CheckType(T) (note that this code sequence has no memory accesses, all non-register instruction operands are immediate operands):

```
C::CheckType(T):
    cmp    ecx,   #C     ; compare T with C's descriptor
    jeq    L             ; jump to L if T = = C
    cmp    ecx,   #C3    ; compare T with C3's descriptor
    jeq    L             ; jump to L if T = = C3
    cmp    ecx,   #C2    ; compare T with C2's descriptor
    jeq    L             ; jump to L if T = = C2
    cmp    ecx,   #C1    ; compare T with C1's descriptor
    jeq    L             ; jump to L if T = = C1
    cmp    ecx,   #I3    ; compare T with I3's descriptor
    jeq    L             ; jump to L if T = = I3
    cmp    ecx,   #I2    ; compare T with I2's descriptor
    jeq    L             ; jump to L if T = = I2
    cmp    ecx,   #I1    ; compare T with I1's descriptor
    jeq    L             ; jump to L if T = = I1
    call throwCheckTypeException ; O not an instance of T
L:
    ret                  ; return successfully
```

The algorithm for generating this sequence at runtime is:

```
For each type T in SuperTypes(C) {
    Emit("cmp ecx,T");
    Emit("jeq L");
}
```

Emit("call throwCheckTypeException");
EmitLabel("L")
Emit("ret")

On IA-32 we can optimize the code sequence further by removing the jumps to the return instruction. If we apply this optimization with the optimization that splits CheckType(T) into CheckTypeClass and CheckTypeInterface:

```
c::CheckTypeClass(T)
    pop     edx             ; move return address to edx
    cmp     ecx, #C         ; compare T with C's descriptor
    jeq     edx             ; return if T = = C
    cmp     ecx, #C3        ; compare T with C3's descriptor
    jeq     edx             ; return if T = = C3
    cmp     ecx, #C2        ; compare T with C2's descriptor
    jeq     edx             ; return if T = = C2
    cmp     ecx, #C1        ; compare T with C1's descriptor
    jeq     edx             ; return if T = = C1
    push    edx
    call    throwCheckTypeException C::CheckTypeInterface(T) :
    pop     edx             ; move return address to edx
    cmp     ecx #I3         ; compare T with I3's descriptor
    jeq     edx             ; return if T = = I3
    cmp     ecx, #I2        ; compare T with I2's descriptor
    jeq     edx             ; return if T = = I2
    cmp     ecx, #I1        ; compare T with I1's descriptor
    jeq     edx             ; return if T = = I1
    push    edx
    call    throwCheckTypeException
```

On the IA-64 architecture, the code sequence for C::CheckType(T) is:

```
C:CheckTypeClass(T)
{.mli
    nop.m
    movl  r14,     #C    }
{.mli
    nop.m
    movl  r15,     #C1  ;;}
{.mib
    cmp.eq  p6,p0 = r14, r8
    nop.i
```

```
        (p6) br.cond    L}
{.mib
        cmp.eq  p7,p0  = r15, r8
        nop.i
        (p7) br.cond    L; ;}
{.mli
        nop.m
        movl r14,       #C2    }
{.mli
        nop.m
        movl r15,       #C3 ; ;}
{.mib
        cmp.eq  p6, p0 = r14, r8
        nop.i
        (p6) br.cond    L}
{.mib
        cmp.eq  p7, p0 = r15, r8
        nop.i
        (p7) br.cond    L; ;}
{.mli
        nop.m
        movl r14, throwCheckTypeException ; ;}
{.mib
        nop.m
        mov     b6 = r14
        nop.b ; ;}
{.mib
        nop.m
        mov r40 = b0    // saving return address
        br.call  b0 = b6 ; ;}
{.mib
        nop.m
        mov b0 = r40
        nop.b    ; ; }
L:
    // return code sequence

========  ============================  ========

C:CheckTypeInterface(T)
{.mli
        nop.m
        movl r14, #I1  }
{.mli
        nop.m
        movl r15, #I2 ; ;}
```

```
{.mib
    cmp.eq   p6, p0 = r14, r8
    nop.i
    (p6) br.cond    L}
{.mib
    cmp.eq   p7, p0 = r15, r8
    nop.i
    (p7) br.cond    L;;}
{.mli
    nop.m
    movl r14, #I3    }
{.mli
    nop.m
    movl r15, throwCheckTypeException ; ;}
{.mib
    cmp.eq   p6, p0 = r14, r8
    mov b6 = r15
    (p6) br.cond    L ; ;}
{.mib
    nop.m
    mov r40 = b0     // saving return address
    br.call  b0 = b6 ; ;}
{.mib
    nop.m
    mov b0 = r40
    nop.b ; ; }
L:
    // return code sequence
```

Copyright 2002 Intel Corporation

What is claimed is:

1. A computer implemented method comprising:
   determining a type hierarchy set for a specified type, the specified type pertaining to a plurality of objects of an object oriented computer language, the type hierarchy set including at least one element;
   generating a virtual function to effect a dynamic type checking of each of the at least one element of the type hierarchy set; and
   including the virtual function in a metadata of each of the plurality of objects.

2. The method of claim 1, wherein the object oriented computer language is selected from the group consisting of JAVA, C++, C#, and CLI.

3. The method of claim 1, wherein said generating the virtual function further includes generating a virtual function to effect a dynamic type checking of each of a plurality of supertypes and generating a virtual function to effect a dynamic type checking of each of a plurality of superinterfaces.

4. The method of claim 1, wherein the virtual function includes a search code sequence selected by a compiler based upon a number of elements in the type hierarchy set.

5. The method of claim 4, wherein the virtual function includes a binary search code sequence.

6. The method of claim 4, wherein the virtual function includes a linear search code sequence.

7. The method of claim 1, wherein a frequently checked type hierarchy element is checked before other type hierarchy elements.

8. The method of claim 1, wherein the virtual function supplants a linked data structure function.

9. A computer implemented method comprising:
   unrolling a search loop of a linked data structure dynamic type checking algorithm to obtain a type hierarchy set for a specified type, the specified type pertaining to a plurality of objects of an object oriented computer language, the type hierarchy set including at least one element;
   loading type identifiers for the at least one element from instruction immediates; and
   effecting a dynamic type check for the specified type.

10. The method of claim 9, wherein the object oriented computer language is selected from the group consisting of JAVA, C++, C#, and CLI.

11. The method of claim 9, wherein a frequently checked type hierarchy element is checked before other type hierarchy elements.

12. A machine-readable medium comprising executable instructions which, when executed by a processor, cause the processor to perform a method, the method comprising:
   determining a type hierarchy set for a specified type, the specified type pertaining to a plurality of objects of an object oriented computer language, the type hierarchy set including at least one element;
   generating a virtual function to effect a dynamic type checking of each of the at least one element of the type hierarchy set; and
   including the virtual function in a metadata of each of the plurality of objects.

13. The machine-readable medium of claim 12, wherein the object oriented computer language is selected from the group consisting of JAVA, C++, C#, and CLI.

14. The machine-readable medium of claim 12, further including instructions to generate a virtual function to effect a dynamic type checking of each of a plurality of supertypes and to generate a virtual function to effect a dynamic type checking of each of a plurality of superinterfaces.

15. The machine-readable medium of claim 12, wherein the virtual function includes a search code sequence selected by a compiler based upon a number of elements in the type hierarchy set.

16. The machine-readable medium of claim 15, wherein the virtual function includes a binary search code sequence.

17. The machine-readable medium of claim 15, wherein the virtual function includes a linear search code sequence.

18. The machine-readable medium of claim 12, wherein a frequently checked type hierarchy element is checked before other type hierarchy elements.

19. The machine-readable medium of claim 12, wherein the virtual function supplants a linked data structure function.

20. A machine-readable medium comprising executable instructions which, when executed by a processor, cause the processor to perform a method, the method comprising:
   unrolling a search loop of a linked data structure dynamic type checking algorithm to obtain a type hierarchy set for a specified type, the specified type pertaining to a plurality of objects of an object oriented computer language, the type hierarchy set including at least one element;
   loading type identifiers for the at least one element from instruction immediates; and
   effecting a dynamic type check for the specified type.

21. The machine-readable medium of claim 20, wherein the object oriented computer language is selected from the group consisting of JAVA, C++, C#, and CLI.

22. The machine-readable medium of claim 20, wherein a frequently checked type hierarchy element is checked before other type hierarchy elements.

23. An apparatus comprising a processor and a memory coupled to the processor, characterized in that the memory has stored therein instructions which, when executed by the processor, cause the processor to perform operations comprising a) determine a type hierarchy set for a specified type, the specified type pertaining to a plurality of objects of an object oriented computer language, the type hierarchy set including at least one element, b) generate a virtual function to effect a dynamic type checking of each of the at least one element of the type hierarchy set, and c) include the virtual function in a metadata of each of the plurality of objects.

24. The apparatus of claim 23, wherein the object oriented computer language is selected from the group consisting of JAVA, C++, C#, and CLI.

25. The apparatus of claim 23, wherein said generating the virtual function further includes generating a virtual function to effect a dynamic type checking of each of a plurality of supertypes and generating a virtual function to effect a dynamic type checking of each of a plurality of superinterfaces.

26. The apparatus of claim 23, wherein the virtual function includes a search code sequence selected by a compiler based upon a number of elements in the type hierarchy set.

27. An apparatus comprising a processor and a memory coupled to the processor, characterized in that the memory has stored therein instructions which, when executed by the processor, cause the processor to perform operations comprising a) unroll a search loop of a linked data structure dynamic type checking algorithm to obtain a type hierarchy set for a specified type, the specified type pertaining to a plurality of objects of an object oriented computer language, the type hierarchy set including at least one element, b) load type identifiers for the at least one element from instruction immediates, and c) dynamically type check the specified type.

28. The apparatus of claim 27, wherein the object oriented computer language is selected from the group consisting of JAVA, C++, C#, and CLI.

29. The apparatus of claim 27, wherein a frequently checked type hierarchy element is checked before other type hierarchy elements.

30. The apparatus of claim 27, wherein the at least one element is checked without reference to where the element appears in a hierarchy.

* * * * *